(12) United States Patent
Naya et al.

(10) Patent No.: US 8,885,198 B2
(45) Date of Patent: Nov. 11, 2014

(54) IMAGE FORMING APPARATUS, CONTROL METHOD FOR IMAGE FORMING APPARATUS, AND STORAGE MEDIUM FOR PERFORMING POWER-SAVING CONTROL

(75) Inventors: Yuji Naya, Kawasaki (JP); Keishi Inaba, Yokohama (JP); Koji Shimizu, Tokyo (JP); Kohei Asano, Yokohama (JP); Kiyokazu Umimura, Kawasaki (JP); Yuichi Konosu, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 13/568,926

(22) Filed: Aug. 7, 2012

(65) Prior Publication Data
US 2013/0050752 A1 Feb. 28, 2013

(30) Foreign Application Priority Data
Aug. 26, 2011 (JP) ................................. 2011-184446

(51) Int. Cl.
G06F 3/12 (2006.01)
G06K 15/00 (2006.01)
G06F 3/00 (2006.01)

(52) U.S. Cl.
CPC .................................. *G06K 15/4055* (2013.01)
USPC .............. 358/1.15; 358/1.14; 710/14; 710/15

(58) Field of Classification Search
None
See application file for complete search history.

(56) References Cited

U.S. PATENT DOCUMENTS

2002/0080390 A1 * 6/2002 Ogura .......................... 358/1.15

FOREIGN PATENT DOCUMENTS

| JP | 6-85867 A | 3/1994 |
| JP | 10-243043 A | 9/1998 |

* cited by examiner

*Primary Examiner* — Thomas Lett
(74) *Attorney, Agent, or Firm* — Canon USA, Inc., IP Division

(57) ABSTRACT

An image forming apparatus includes a communication unit configured to communicate with a server apparatus, a power supply control unit configured to repeat power supply to the communication unit, and an inquiry unit configured to make an inquiry to the server apparatus about whether to turn on a second power supply unit that energizes a controller that controls the image forming apparatus, each time the communication unit becomes communicable with the server apparatus by the power supply control unit, wherein the power supply control unit repeats power supply to the communication unit for each of a plurality of predetermined time periods, until receiving a response to turn on the power of the second power supply unit from the server apparatus in response to the inquiry by the inquiry unit.

8 Claims, 6 Drawing Sheets

IMAGE FORMING APPARATUS, CONTROL METHOD FOR IMAGE FORMING APPARATUS, AND STORAGE MEDIUM FOR PERFORMING POWER-SAVING CONTROL

BACKGROUND OF THE INVENTION

1. Field of the Invention

The present invention relates to an image forming apparatus that performs power-saving control, and to a control method for the image forming apparatus and a storage medium.

2. Description of the Related Art

Conventionally, a method for turning on the power of an image forming apparatus or a data processing apparatus by a remote operation is known. The method uses a communication control unit that stands by for receiving a signal in a constantly power-on state, in order to receive communication data which requests power-on from a server apparatus at a remote location as discussed in Japanese Patent Application Laid-Open No. 6-85867.

Further, a method in which a signal line monitoring apparatus connected to an auxiliary power supply stands by for receiving a signal during the power-off state for the purpose of power consumption reduction, and turns on a main power supply of the computer system only by detecting a change of the signal is known as discussed in Japanese Patent Application Laid-Open No. 10-243043.

However, in the above-described techniques, since the communication control unit and the signal line monitoring apparatus are constantly connected to the power supply, and are in a signal reception standby state even in a time zone such as late at night when there is less possibility of power-on, wasteful power consumption will be increased. That is, power is to be constantly supplied, to minimum required modules for receiving the communication data requesting the power-on from the server apparatus.

SUMMARY OF THE INVENTION

The present invention is directed to an image forming apparatus capable of performing power-on processing in response to a request from a server apparatus, while suppressing power consumption of the image forming apparatus.

According to an aspect of the present invention, an image forming apparatus that performs power supply control according to an instruction received from a server apparatus includes a communication unit configured to communicate with the server apparatus, a power supply control unit configured to repeat power supply to the communication unit, and an inquiry unit configured to make an inquiry to the server apparatus about whether to turn on a second power supply unit that energizes a controller that controls the image forming apparatus, each time the communication unit becomes communicable with the server apparatus by the power supply control unit, wherein the power supply control unit repeats power supply to the communication unit for each of a plurality of predetermined time periods, until receiving a response to turn on the power of the second power supply unit from the server apparatus in response to the inquiry by the inquiry unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

The constituent elements described in these exemplary embodiments are just examples, and the invention is not intended to limit the scope of the invention only to these.

Figure 1:
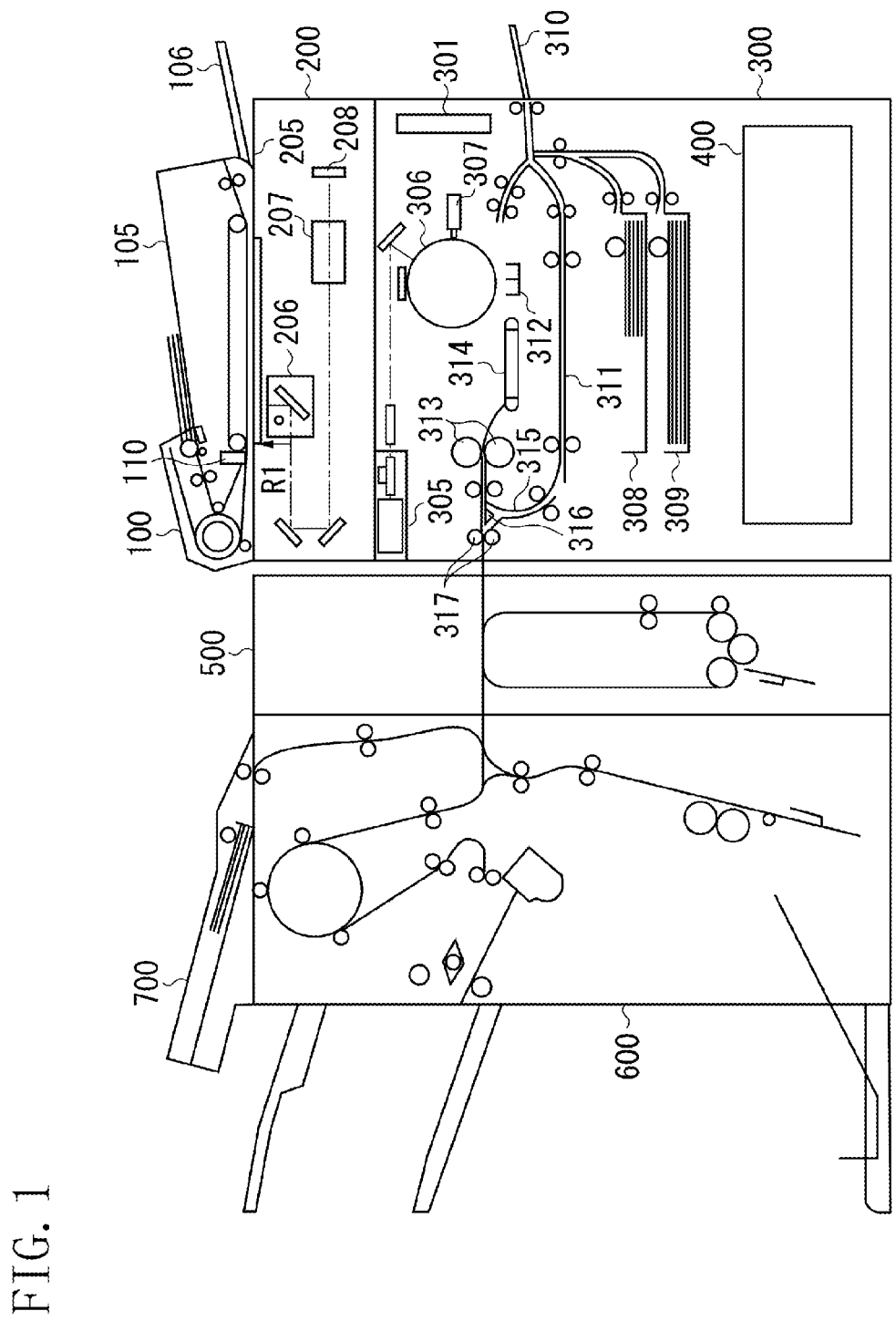
FIG. 1 is a diagram illustrating a configuration of an image forming apparatus according to a first exemplary embodiment of the present invention.

FIG. 1 is a diagram illustrating a configuration of an image forming apparatus according to an exemplary embodiment of the present invention. The image forming apparatus illustrated in the present exemplary embodiment includes an image forming apparatus main body including an image reader 200 and a printer unit 300, a folding device 500, and a finisher 600. On the top of the image reader 200, a document conveyance device 100 is mounted.

Further, on the top of the finisher 600, an inserter 700 is provided. The image forming apparatus is configured to be capable of communicating with a server apparatus 453 via a communication control unit 405 described below, and to acquire a packet for controlling startup processing described below.

Further, the image forming apparatus according to the present exemplary embodiment, when performing power supply control according to a power supply control instruction received from the server apparatus, executes inquiry processing to the server apparatus 453 by the communication control unit 405 according to flowcharts illustrated in FIGS. 5 and 6 described below.

In FIG. 1, the document conveyance device 100 feeds documents set on a document tray 105 one by one sequentially from the top, and conveys onto a document mounting glass 205 via a curved path. A method for reading a one-sided document has two reading modes.

One of the reading modes is a document fixed-reading mode (a first reading mode). In this mode, a trailing edge of a document is conveyed and stopped at a reading position R1 on the document mounting glass 205, and the document is read by causing a scanner unit 206 to move from left to right.

Another reading mode is a document feeding-reading mode (a second reading mode). In this mode, the document is conveyed to the reading position R1 at a certain reading speed, and the document is read while the scanner unit 206 is fixed at the reading position R1. After that, in any of the modes, the read document is discharged to a sheet discharge tray 106.

As a method for reading a two-sided document, there is a method in which the front side of the sheet is read by the scanner unit 206, and the back side is read using an optical unit 110 arranged in the document conveyance device 100. The details will be described below. In the optical unit 110, an image sensor and a light source (not illustrated) are arranged.

An image of the document read by an image sensor 208 via a lens 207 is sent to an exposure control unit 305 via a printer control unit 301. The exposure control unit 305 outputs a laser beam corresponding to an image signal. When the laser beam is irradiated onto a photosensitive drum 306, an electrostatic latent image is formed on the photosensitive drum 306.

The electrostatic latent image on the photosensitive drum 306 is developed by a developing unit 307, and a developer on the photosensitive drum 306 is transferred by a transfer unit 312 onto the sheet fed from either cassettes 308 and 309, a manual feed unit 310, and a two-sided conveyance path 311.

When the sheet onto which the developer has been transferred is guided to the fixing unit 313, fixing processing of the developer is carried out. The sheet which has passed through the fixing unit 313 is, temporarily, guided from a path 315 to a path 314 by a flapper (not illustrated). After the trailing edge of the sheet comes out of the path 315, the sheet is switched back and guided from a path 316 to a discharge roller 317.

Accordingly, the sheets can be discharged from the printer unit 300 by the discharge roller 317 in a state where the developer-transferred-side faces downward (facedown). This is referred to as inversed discharge. By discharging the sheet face-down in this way, an image formation can be performed in a correct order of from a top page, in a case of printing images generated by reading a plurality of documents using the document conveyance device 100.

In a case where an image formation is performed on a hard sheet such as an overhead projector (OHP) sheet fed from the manual feed unit 310, the hard sheet is discharged from the discharge roller 317 keeping the developer-transferred-side upward (face-up), without the guiding it to the path 315.

Further, in a case where an image formation is performed on both sides of the sheet, the sheet is guided from the fixing unit 313 to the path 315 and the path 314, and the sheet is switched back immediately after the trailing edge of the sheet comes out of the path 315, and is guided to a two-sided conveyance path 311 by the flapper (not illustrated). Onto the sheet guided to the two-sided conveyance path 311, again, the electrostatic latent image is transferred by the transfer unit 312, and is subjected to fixing processing by the fixing unit 313.

In this way, path lengths, roller arrangements, and driving systems are divided so that the sheets can be conveyed even when five half-size sheets of A4, or B5 are contained in one loop of the path starting from the transfer unit 312 via the two-sided conveyance path 311 and again returning to the transfer unit 312. Since the order of pages discharged by the processing is such that odd number pages are discharged facing downward, the order of pages during two-sided copying can be collated.

The sheet discharged from the discharge roller 317 is conveyed into the folding device 500. The folding device 500 performs processing for folding the sheet into Z-folding. When folding processing of A3 size or B4 size sheet is specified, the A3 size or B4 size sheet is fed into the finisher 600 after folding processing is performed by the folding device 500, but the sheet in other sizes is directly conveyed into the finisher 600.

The finisher 600 performs bookbinding processing, binding processing, punching and other processing. Further, the inserter 700 is provided on the top of the finisher 600 for feeding a cover, and an interleaf to the finisher 600. A controller control unit 400 performs communication with the image reader 200, the printer unit 300, the folding device 500, and the finisher 600, and performs control of the entire image forming apparatus.

Figure 2:
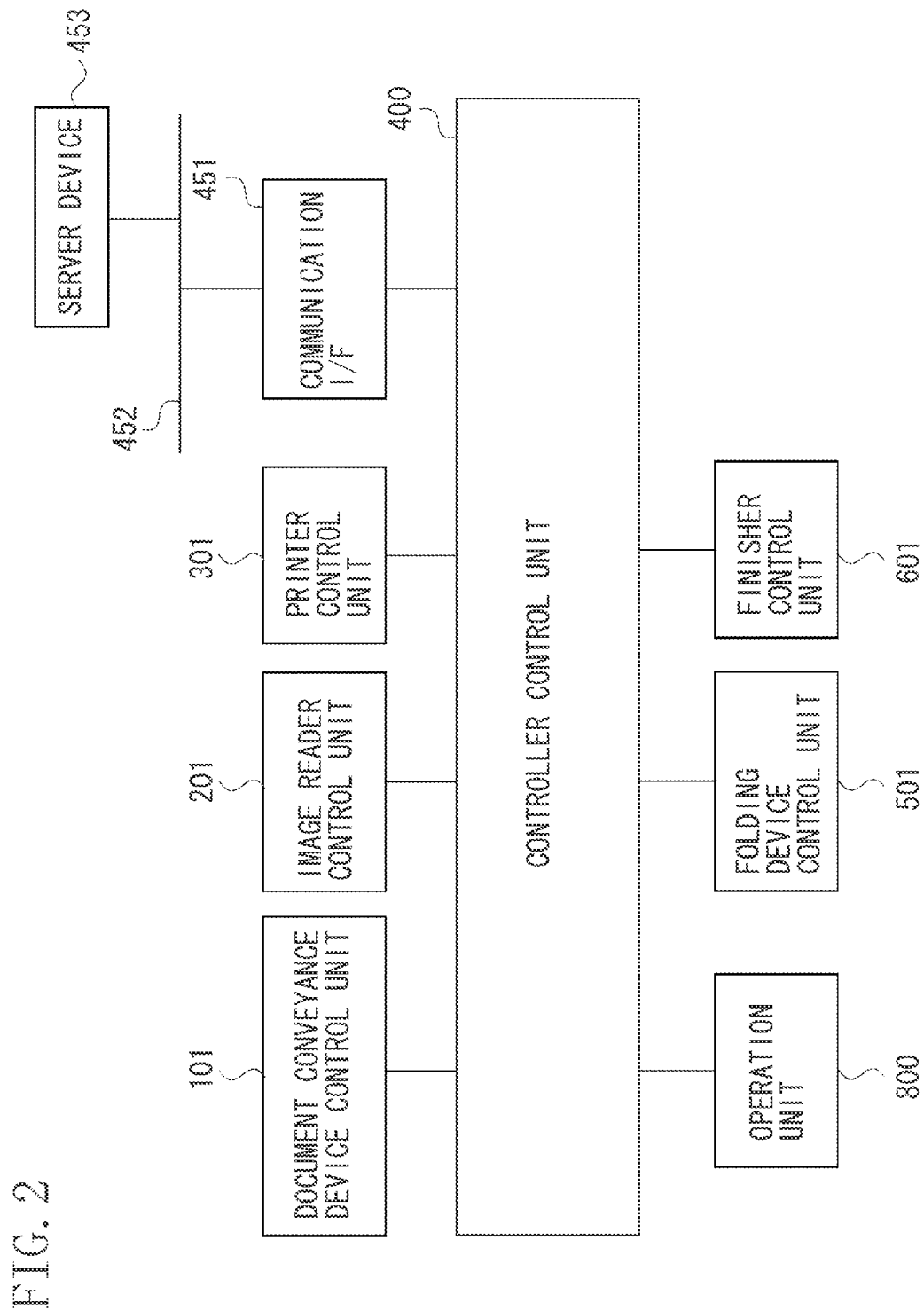
FIG. 2 is a block diagram illustrating an entire configuration of a control unit of the image forming apparatus illustrated in FIG. 1.

FIG. 2 is a block diagram illustrating an entire configuration of the control unit of the image forming apparatus illustrated in FIG. 1. This example is configured centering on the controller control unit 400 that controls the entire image forming apparatus.

In FIG. 2, the controller control unit 400 is connected with a document conveyance device control unit 101 that controls the document conveyance device 100 according to settings of the operation unit 800 or instructions from the server apparatus 453. Further, the controller control unit 400 performs communication with an image reader control unit 201 that controls the image reader 200, to acquire image data of the document to be input.

Furthermore, the controller control unit 400 performs communication with the printer control unit 301 that controls the printer unit 300, and prints the image data on the sheet. The controller control unit 400 performs communication with a folding device control unit 501 that controls the folding device 500, a finisher control unit 601 that controls the finisher 600, and realizes a desired output such as stapling or punching holes on the printed sheets.

Figure 3:
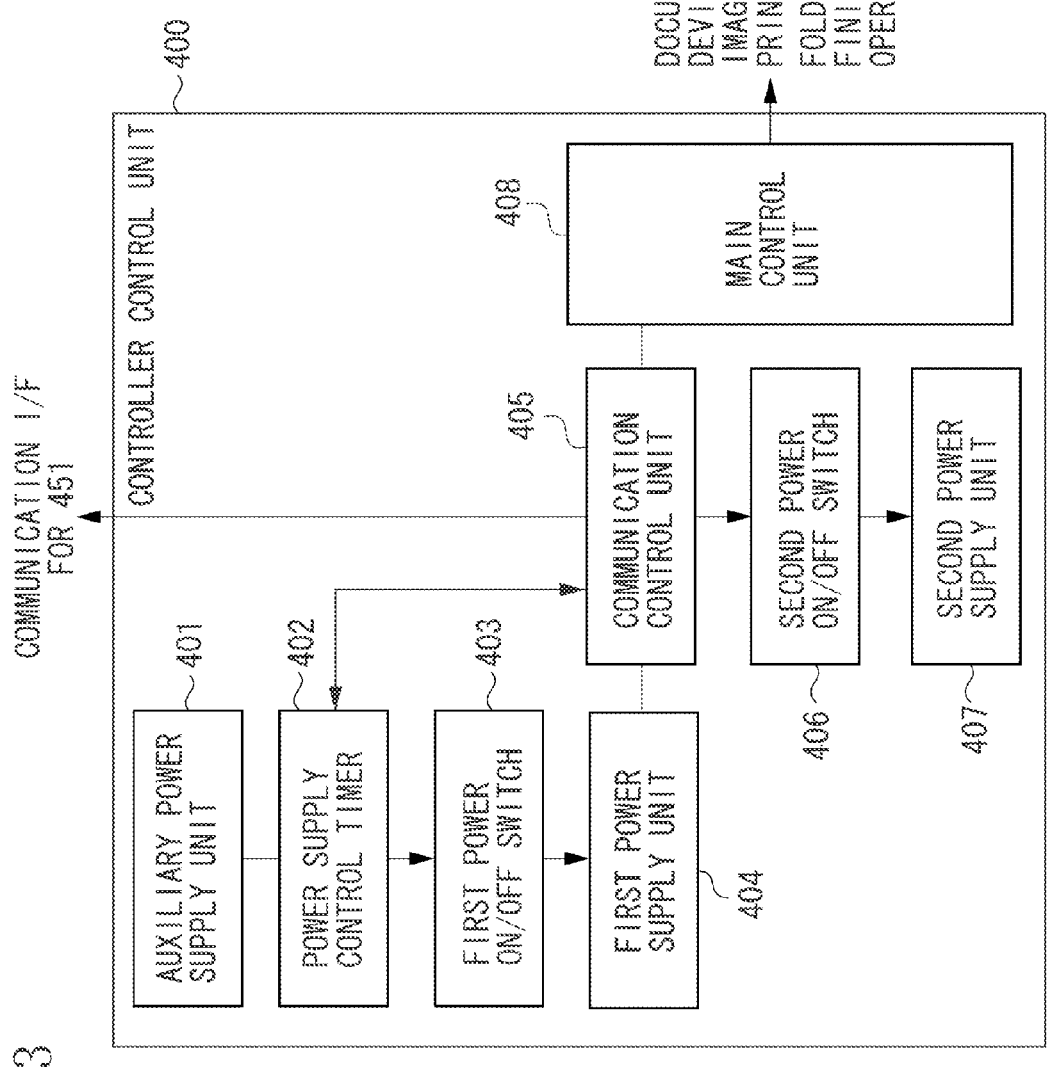
FIG. 3 is a block diagram illustrating a configuration of the controller control unit illustrated in FIG. 2.

A communication interface I/F 451 is an interface for connecting the server apparatus 453, via an external bus 452 such as a network or a universal serial bus (USB), and performs rasterizing and outputting print data from the server apparatus 453 into images. FIG. 3 is a block diagram illustrating a configuration of the controller control unit 400 illustrated in FIG. 2.

In FIG. 3, the controller control unit 400 is controlled by a main control unit 408, and various types of input and output processing, and communication processing are controlled by an operating system (hereinafter, referred to OS). Further, a communication control unit 405 controls a network or a USB interface, and is communicably connected to the server apparatus and the data processing apparatus. The communication control unit 405 can set a timing when to start up a power control timer 402.

The main control unit 408 is connected to the document conveyance device control unit 101, the image reader control unit 201, a printer control unit 301, the folding device control unit 501, the finisher control unit 601, and the operation unit 800, and performs control thereof. A first power ON/OFF switch 403 switches on and off of the first power supply unit 404 that supplies the power to the communication control unit 405.

In the present exemplary embodiment, as an example of the power supply control unit, there is provided the power control timer 402 constantly energized, and the first power on/off switch 403 for switching power-on and power-off of the first power supply unit 404 in synchronization with a timer signal output by the power control timer 402 for each elapse of a predetermined time. A second power ON/OFF switch 406 switches on and off of a second power supply unit 407 that supplies power to the main control unit 408.

An auxiliary power supply unit 401 constantly supplies power to the power control timer 402, and the power control timer 402 can operate independently. The power control timer 402 is connected to the first power on/off switch 403, and performs timer control of on and off of the first power supply unit 404.

The communication control unit 405, which is in charge of performing communication processing with the server apparatus 453, is connected to the second power on/off switch 406, and controls on/off of the second power supply unit 407 based on determination of a packet received via the communication I/F 451. Further, the communication control unit 405 sets the next startup time of the power control timer 402.

Figure 4:
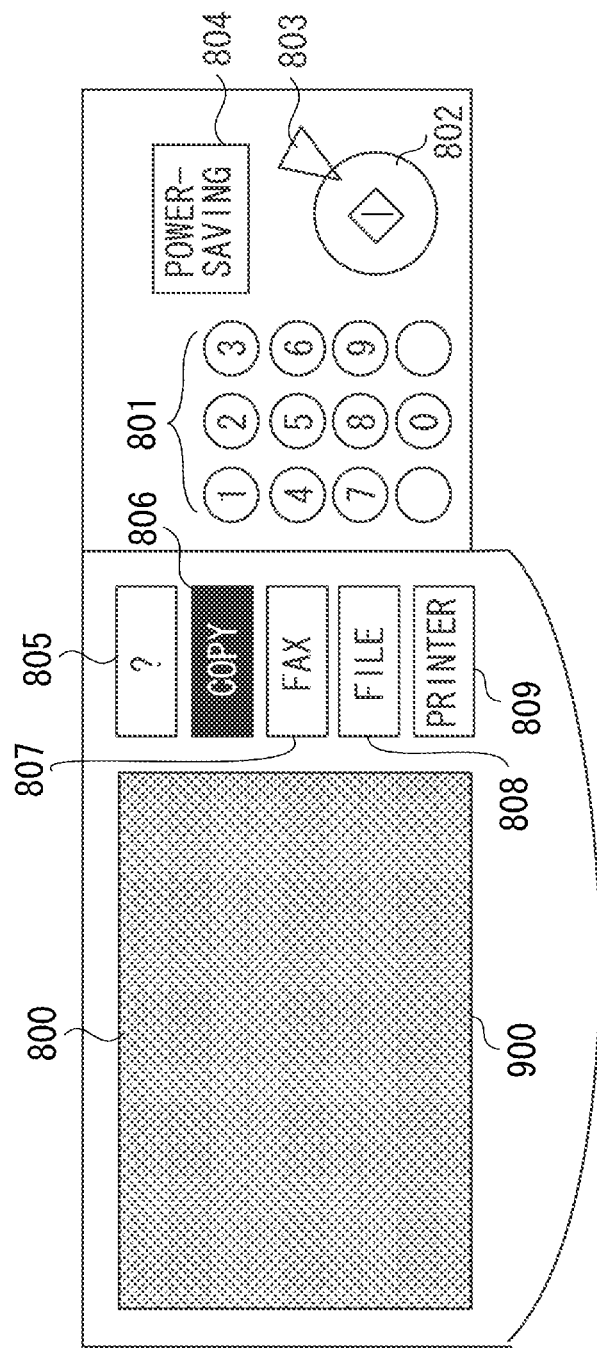
FIG. 4 is a diagram illustrating a configuration of an operation unit of the image forming apparatus illustrated in FIG. 1.

FIG. 4 illustrates a configuration of the operation unit 800 of the image forming apparatus illustrated in FIG. 2. In FIG. 4, a liquid crystal display (LCD) unit 900 has a touch panel sheet stuck on the LCD, and when an operation screen of the system is displayed, and a displayed key is pressed according to a user's operation, sends its positional information to the controller control unit 400.

A ten key 801 is used when inputting numerical values such as a number of copies. A start key 802 is used, after setting a desired condition of a user, to start copying operation, and reading operation of documents. A stop key 803 is used when stopping a running operation. An energy-saving key 804 is used f to shift the mode to, and return the mode from the power-saving mode.

When a guide key 805 is pressed when a user does not know the function of a key, an explanation of the key is displayed. A copy mode key 806 is pressed when copying is performed. A fax key 807 is pressed when setting relating to the facsimile (fax) is performed. A file key 808 is pressed when outputting file data. A printer key 809 is used when performing settings relating to printout from an external apparatus such as a computer.

Hereinbelow, a remote power supply control method for the image forming apparatus and how to use thereof according to the present exemplary embodiment will be described in detail.

Figure 5:
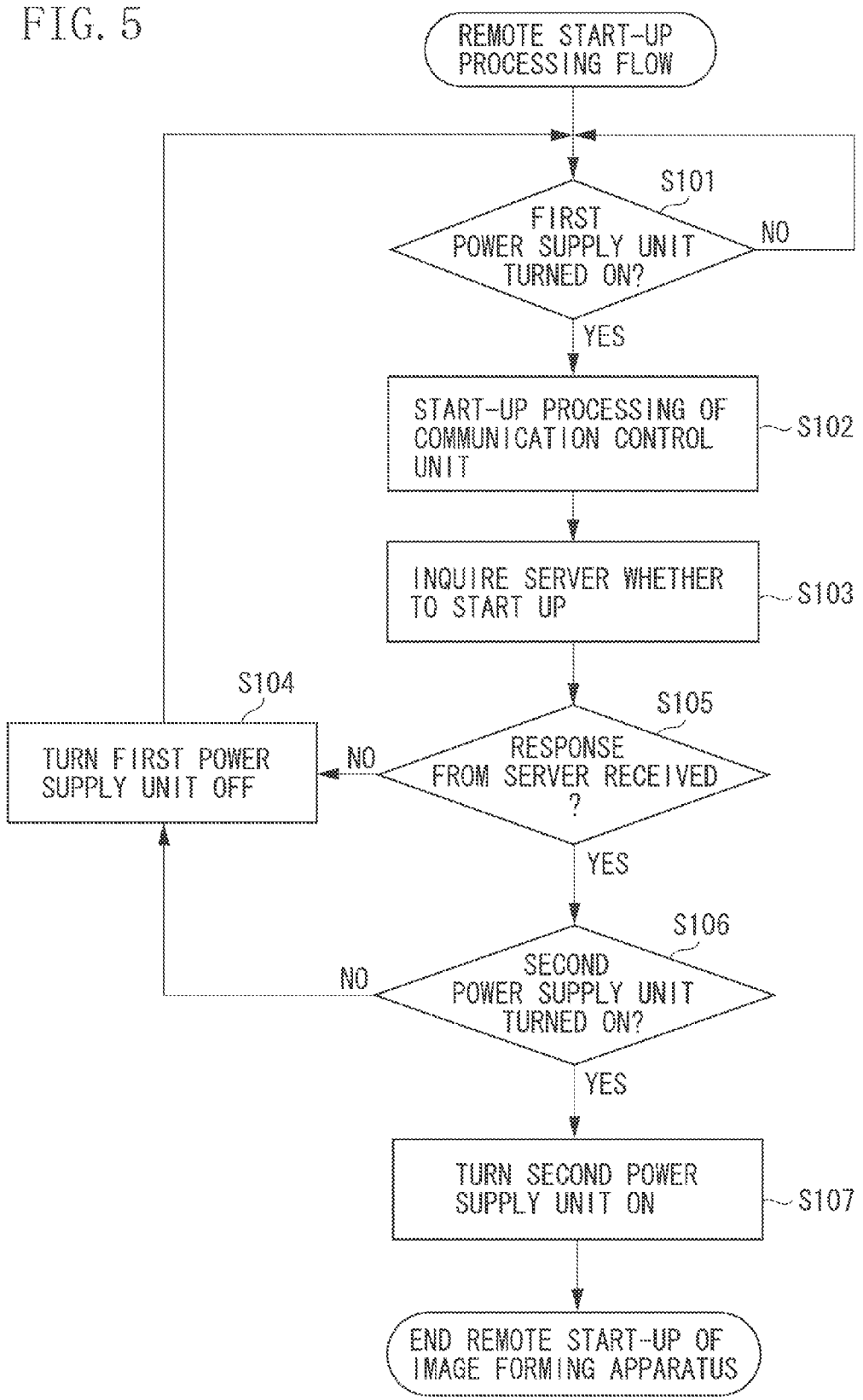
FIG. 5 is a flowchart illustrating a control method for the image forming apparatus.

FIG. 5 is a flowchart illustrating the control method for the image forming apparatus according to the present exemplary embodiment. This example is a remote startup processing example in which the image forming apparatus receives a startup command packet from an external server, to turn on the second power supply unit 407. Further, the processing is performed after the communication control unit 405 has received a remote off instruction from the server apparatus 453, and after the image forming apparatus main body is shut down. Through this shutdown, the second power supply unit 407, which is a power supply to the main control unit 408, goes into an off state.

In the present exemplary embodiment, it is assumed that the image forming apparatus is in a power-off state where the power is not being supplied to the image forming apparatus, and only the power control timer 402 is in an operable state by power supply from the auxiliary power supply unit 401, and power supply to other devices is restricted.

First, in step S101, the communication control unit 405 in the controller control unit 400 is in a power-off state until the first power supply unit 404 is turned on.

When the power control timer 402 turns on the first power supply unit 404, in step S102, the communication control unit 405 supplied with the power from the first power supply unit 404 performs startup processing. For example, the power control timer 402 drives the first power on/off switch 403 to turn the first power supply unit 404 at constant time intervals.

When the startup processing of the communication control unit 405 is finished, in step S103, the communication control unit 405 makes an inquiry to the server apparatus 453 about whether to start up the image forming apparatus, via the communication I/F 451. After the inquiry has been made by the communication control unit 405, in step S105, the image forming apparatus stands by until an answer packet is received from the server apparatus 453.

In this way, in the present exemplary embodiment, the power control timer 402 executes power supply control for repeating energization from the first power supply unit 404 to the communication control unit 405 for each elapse of a predetermined time. In other words, the power control timer 402 turns on the first power supply unit 404 for each elapse of the predetermined time, and causes the communication control unit 405 to be ready for communication with the server apparatus 453.

Then, the communication control unit 405 makes inquiry to the server apparatus 453 about whether to turn on the second power supply unit 407 which energizes the controller (the main control unit 408) which controls the image forming apparatus.

Then, if the communication control unit 405 determines that no answer packet has been received from the server apparatus 453 even when the predetermined time has elapsed (NO in step S105), in step S104, the power control timer 402 turns off the power supply from the first power supply unit 404 to the communication control unit 405. Then, the processing returns to step S101, and again the power control timer 402 turns on the first power supply unit 404 at the constant time interval set for the power control timer 402.

On the other hand, in step S105, if the communication control unit 405 determines that an answer packet has been received from the server apparatus 453 within the predetermined time (YES in step S105), the communication control unit 405 judges the responded packet, then in step S106, determines whether to turn on the second power supply unit 407.

If the communication control unit 405 determines that the responded packet is a packet which turns on the second power supply unit 407 (YES in step S106), then in step S107, the communication control unit 405 turns on the second power supply unit 407, and ends the processing. Accordingly, the main control unit 408 is started up to activate the control unit involved in an image formation, and shifts the image forming apparatus to an idle status in which images can be formed.

On the other hand, in step S106, if the communication control unit 405 determines that the packet received from the server apparatus 453 is a packet which does not turn on the second power supply unit 407 (NO in step S106), in step S104, the power control timer 402 turns off the power supply of the communication control unit 405. Then, the processing returns to step S101, and again the power control timer 402 turns on the first power supply unit 404 at constant time interval.

Accordingly, after shifting to a shutdown status according to the packet received from the server apparatus 453, an inquiry to the server apparatus 453 about whether to start up the image forming apparatus is made mainly by the communication control unit 405. Then, upon receiving from the server apparatus 453 a packet which turns on the second power supply unit 407 in response to this inquiry, the second power supply unit 407 can be shifted to power-on state for bringing the image forming apparatus into an image formable state.

In the present exemplary embodiment, instead of putting the communication control unit 405 to a constantly running state, the communication control unit 405 is energized by the first power supply unit 404 when a set scheduled time is reached. Then, the communication control unit 405 makes an inquiry to the server apparatus 453 about whether to turn on the second power supply unit 407. Therefore, the power consumption for the communication processing can be suppressed below 1W, and the power-saving effect can be improved compared to the power consumption conventionally consumed by the inquiry processing.

In the above-described exemplary embodiment, the case where the repetitive timing of returning to step S101 from step S104, and repeating steps S102 to S104 is controlled at a preset time interval has been described. However, it may be configured in such a manner that repetitive timing can be changed according to the preset schedule. Hereinbelow, a second exemplary embodiment will be described.

Figure 6:
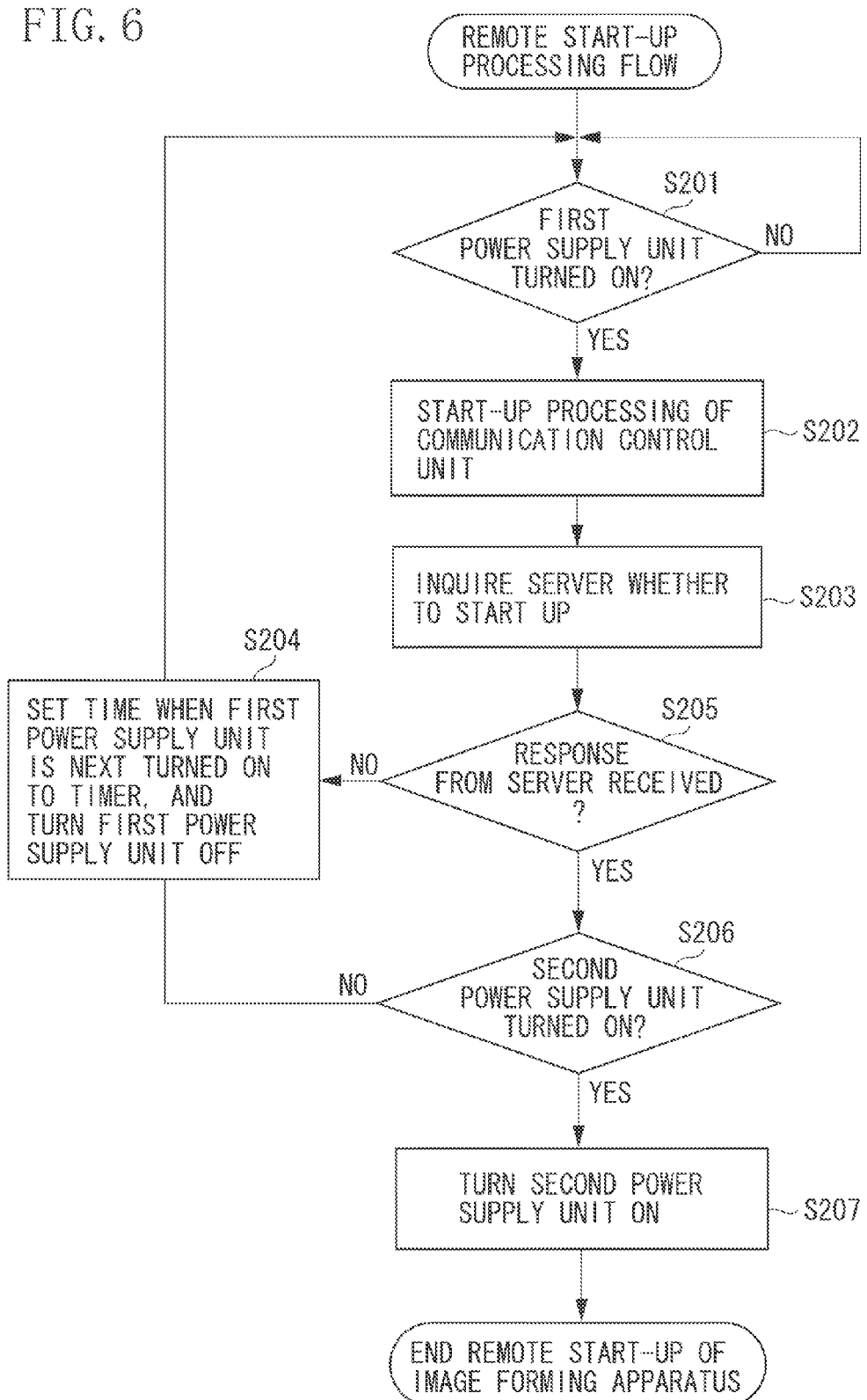
FIG. 6 is a flowchart illustrating a control method for a second image forming apparatus.

FIG. 6 is a flowchart illustrating a control method for an image forming apparatus according to the present exemplary embodiment. The exemplary embodiment is a remote startup processing example in which the image forming apparatus receives a startup command packet from an external server, to turn on the second power supply unit 407. Further, in the present exemplary embodiment, it is assumed that the image forming apparatus is in a power-off state where power is not being supplied to the image forming apparatus, only the power control timer 402 is operable by power supply from the auxiliary power supply unit 401, and power supply to other devices is restricted.

First, in step S201, the communication control unit 405 in the controller control unit 400 is in a power-off state, until the first power supply unit 404 is turned on.

Next, in step S202, the power control timer 402 turns on the first power supply unit 404 (YES in step S201), in step S202, the communication control unit 405 which has been supplied with power performs startup processing. For example, the power control timer 402, when a predetermined time has elapsed, turns on the first power supply unit 404. Alternatively, the first power supply unit 404 may be turned on at a time of day that the user has set for the power control timer 402, via the communication I/F 451 from the server apparatus 453.

Next, in step S203, the startup processing of the communication control unit 405 is completed, and the communication control unit 405 makes inquiry about whether to start up the image forming apparatus to the server apparatus 453, via the communication I/F 451.

If the communication control unit 405 determines that no answer has been received from the server apparatus 453 (NO in step S205), in step S204, the communication control unit 405 sets the next power-on time for the power control timer 402, and turns off the first power supply unit 404, then the process returns to step S201. For example, a setting may be made to turn on the power after a certain time period. Alternatively, a setting may be made to turn on the power at a specific time.

On the other hand, in step S205, if the communication control unit 405 determines that answer has been received from the server apparatus 453 (YES in step S205), in step S206, the communication control unit 405 judges the responded packet to determine whether to turn on the second power supply unit 407.

If the communication control unit 405 determines that the responded packet is a packet which turns on the second power supply unit 407 (YES in step S206), in step S207, the communication control unit 405 turns on the second power supply unit 407, and ends the processing.

On the other hand, if the communication control unit 405 determines that the responded packet is a packet not to turn on the second power supply unit 407 (NO in step S206), in step S204, the communication control unit 405 sets the next power-on time for the power control timer 402, and turns off the first power supply unit 404, and the processing returns to step S201. At this time, the setting of the power control timer 402 may be a setting to turn the power on after a certain time period. Alternatively, there may be a setting to turn the power on at a specific time.

The intervals at which the communication control unit 405 makes inquiry to the server apparatus 453 may be configured in such a manner that the intervals can be dynamically changed referring to a running history or the like of the image forming apparatus used by the user.

Accordingly, after shifting to a shutdown state according to the packet received from the server apparatus 453, the inquiry is made mainly by the communication control unit 405 about whether to startup at the set intervals, to the server apparatus 453. Then, when a packet for turning on the second power supply unit 407 is received from the server apparatus 453, in response to the inquiry, the second power supply unit 407 is allowed to be transited to on-state in order to bring the image forming apparatus into an image formable state.

Alternatively, the communication control unit 405 may acquire a scheduled time to start up the power control timer 402 from the server apparatus 453, and perform control to execute the inquiry about whether to energize the second power supply unit 407 at the scheduled time.

Even when the communication control unit 405 becomes off-state thereby according to the shutdown instruction from the server apparatus 453, and shifts to not-communicating state on the network, inquiries can be made mainly by the image forming apparatus by starting up the communication control unit 405.

It may be configured in such a manner that the scheduled time to start up the power control timer 402 can be acquired from the network devices other than the server apparatus 453. At this time, the communication control unit 405 determines an acquisition destination of the scheduled time to start up the power control timer 402, referring to an acquisition destination table.

In other words, the power control timer 402 acquires the scheduled time to start up the communication control unit 405 from the server apparatus 453, and starts power supply from the first power supply unit 404 to the communication control unit 405 at the scheduled time acquired by the power control timer 402, and performs the above-described inquiry processing. Accordingly, the inquiry processing with high flexibility of the scheduled time and appropriate to the environment of the user becomes possible.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-184446 filed Aug. 26, 2011, which is hereby incorporated by reference herein in its entirety.

What is claimed is:

1. An information processing apparatus capable of communicating with an external apparatus, comprising:

a communication unit configured to communicate with the external apparatus;

a control unit configured to control the information processing apparatus;

a first power supply unit configured to supply power to the communication unit; and a second power supply unit configured to supply power to the control unit, wherein the first power supply unit starts power supply to the communication unit at a predetermined time interval, wherein the communication unit makes an inquiry to the external apparatus about whether to start up the information processing apparatus, when the power supply is started by the first power supply unit, and wherein the second power supply unit starts power supply to the control unit, in a case where a response to start up the information processing apparatus is received from the external apparatus as a result of the inquiry.

2. The information processing apparatus according to claim 1, wherein the second power supply unit does not start the power supply to the control unit, in a case where a response not to start up the information processing apparatus is received from the external apparatus as a result of the inquiry.

3. The information processing apparatus according to claim 1, wherein the first power supply unit stops the power supply to the communication unit, in a case where a response not to start up the information processing apparatus is received from the external apparatus as a result of the inquiry.

4. The information processing apparatus according to claim 1, wherein the first power supply unit stops the power supply to the communication unit, in a case where no response is received from the external apparatus as a result of the inquiry.

5. The information processing apparatus according to claim 1, wherein the communication unit sets a next start time of the power supply to the communication unit, in a case where a response not to start up the information processing apparatus is received from the external apparatus as a result of the inquiry.

6. The information processing apparatus according to claim 1, wherein the communication unit sets the next start time of the power supply to the communication unit, in a case where no response is received from the external apparatus as a result of the inquiry.

7. A control method for an information processing apparatus capable of communicating with an external apparatus, the control method comprising:

communicating, by a communication unit, with the external apparatus;

controlling, by a control unit, the information processing apparatus;

supplying, by a first power supply unit, power to the communication unit; and supplying, by a second power supply unit, power to the control unit, wherein the supplying step by the first power supply unit starts power supply to the communication unit at a predetermined time interval, wherein the communication step makes an inquiry to the external apparatus about whether to start up the information processing apparatus, when the power supply is started by the first power supply unit, and wherein the supplying step by second power supply unit starts power supply to the control unit, in a case where a response to start up the information processing apparatus is received from the external apparatus as a result of the inquiry.

8. A non-transitory computer-readable storage medium storing a program for causing a computer to execute the control method for the image forming apparatus according to claim 7.

\* \* \* \* \*